United States Patent
Koch et al.

(10) Patent No.: US 9,080,394 B2
(45) Date of Patent: Jul. 14, 2015

(54) THREADED CONNECTION

(75) Inventors: Elmar Koch, Eslohe (DE); Dieter Wurm, Kirchhundem (DE); Rouwen Homringhaus, Lennestadt (DE); Sebastian Fischer, Lennestadt (DE)

(73) Assignee: TRACTO-TECHNIK GMBH & CO., Lennestadt (DE)

( * ) Notice: Subject to any disclaimer, the term of this patent is extended or adjusted under 35 U.S.C. 154(b) by 539 days.

(21) Appl. No.: 13/063,663

(22) PCT Filed: Sep. 8, 2009

(86) PCT No.: PCT/EP2009/006519
§ 371 (c)(1),
(2), (4) Date: Mar. 11, 2011

(87) PCT Pub. No.: WO2010/028809
PCT Pub. Date: Mar. 18, 2010

(65) Prior Publication Data
US 2011/0168286 A1    Jul. 14, 2011

(30) Foreign Application Priority Data
Sep. 12, 2008 (DE) .................. 10 2008 047 060

(51) Int. Cl.
*F16L 55/10* (2006.01)
*B65D 59/06* (2006.01)
*E21B 17/042* (2006.01)
*F16L 15/06* (2006.01)

(52) U.S. Cl.
CPC .......... *E21B 17/042* (2013.01); *E21B 17/0426* (2013.01); *F16L 15/06* (2013.01)

(58) Field of Classification Search
USPC ................. 138/89, 96 T; 175/320; 411/282
See application file for complete search history.

(56) References Cited

U.S. PATENT DOCUMENTS

| | | | | |
|---|---|---|---|---|
| 1,667,910 A | * | 5/1928 | Townsend | 439/735 |
| 3,200,691 A | * | 8/1965 | Neuschotz | 411/422 |
| 4,040,756 A | * | 8/1977 | Donegan | 403/307 |
| 4,292,876 A | * | 10/1981 | De Graan | 411/542 |
| 4,548,431 A | | 10/1985 | Hall et al. | |
| 4,831,674 A | * | 5/1989 | Bergstrom et al. | 470/199 |
| 5,056,611 A | * | 10/1991 | Yousef et al. | 175/415 |
| 5,060,740 A | | 10/1991 | Yousef et al. | |
| 5,163,523 A | * | 11/1992 | Yousef et al. | 175/320 |
| 5,303,743 A | * | 4/1994 | Vincent | 138/96 T |
| 5,340,258 A | * | 8/1994 | Simon | 411/535 |
| 5,735,658 A | | 4/1998 | Härle | |
| 6,030,004 A | * | 2/2000 | Schock et al. | 285/333 |

(Continued)

FOREIGN PATENT DOCUMENTS

| | | |
|---|---|---|
| DE | 38 40 731 A1 | 9/1989 |
| DE | 196 08 980 A1 | 9/1997 |

(Continued)

*Primary Examiner* — Paul R Durand
*Assistant Examiner* — Vishal Pancholi
(74) *Attorney, Agent, or Firm* — Howard IP Law Group, PC (57) ABSTRACT

A threaded plug for a threaded connection includes a core having an exterior thread. At least one flank of the exterior thread forms a segment of an ellipse, wherein the segment of the ellipse extends continuously from a root of the thread to a corresponding crest of the thread. A threaded connection can be formed by combining the threaded plug with a threaded bushing having an interior thread constructed to engage with the exterior thread of the threaded plug.

20 Claims, 8 Drawing Sheets

(56) References Cited

U.S. PATENT DOCUMENTS

| | | | |
|---|---|---|---|
| 6,047,997 A * | 4/2000 | Olivier | 285/333 |
| 6,095,733 A * | 8/2000 | Busby et al. | 411/10 |
| 6,120,227 A * | 9/2000 | Murase et al. | 411/386 |
| 6,196,598 B1 * | 3/2001 | Yao | 285/333 |
| 6,755,447 B2 * | 6/2004 | Galle et al. | 285/390 |
| 6,789,989 B2 * | 9/2004 | Walther | 411/186 |
| 6,810,956 B1 * | 11/2004 | Sandstrom | 166/242.6 |
| 6,854,942 B1 * | 2/2005 | Hargis | 411/369 |
| 7,185,721 B2 * | 3/2007 | Carlstrom et al. | 175/414 |
| 7,210,710 B2 * | 5/2007 | Williamson et al. | 285/333 |
| 7,665,934 B2 * | 2/2010 | Henderer et al. | 408/222 |
| 7,682,108 B2 * | 3/2010 | Satran et al. | 407/87 |
| 7,900,975 B2 * | 3/2011 | Nakamura et al. | 285/334 |
| 8,029,223 B2 * | 10/2011 | Mair | 411/542 |
| 8,210,779 B2 * | 7/2012 | Henderer et al. | 408/222 |
| 2005/0074998 A1 * | 4/2005 | Hall et al. | 439/191 |
| 2005/0189147 A1 * | 9/2005 | Williamson et al. | 175/320 |
| 2005/0225081 A1 * | 10/2005 | Allen | 285/308 |
| 2006/0006648 A1 * | 1/2006 | Grimmett et al. | 285/333 |
| 2006/0220159 A1 * | 10/2006 | Matsuo et al. | 257/414 |
| 2007/0255419 A1 * | 11/2007 | Terrill | 623/22.41 |
| 2008/0044240 A1 * | 2/2008 | Satran et al. | 407/36 |
| 2008/0095587 A1 * | 4/2008 | Henderer et al. | 408/222 |
| 2010/0078936 A1 * | 4/2010 | Nakamura et al. | 285/334 |
| 2012/0295519 A1 * | 11/2012 | Henderer et al. | 451/48 |

FOREIGN PATENT DOCUMENTS

| | | |
|---|---|---|
| DE | 198 03 304 A1 | 12/1998 |
| EP | 0 321 346 A1 | 6/1989 |
| EP | 0 324 442 A1 | 7/1989 |
| GB | 629 837 A | 9/1949 |
| WO | WO 2006/092649 A1 | 9/2006 |
| WO | WO 2008150207 A1 * | 12/2008 |

* cited by examiner

THREADED CONNECTION

CROSS-REFERENCES TO RELATED APPLICATIONS

This application is the U.S. National Stage of International Application No. PCT/EP2009/006519, filed Sep. 8, 2009, which designated the United States and has been published as International Publication No. WO 2010/028809 and which claims the priority of German Patent Application, Serial No. 10 2008 047 060.0, filed Sep. 12, 2008, pursuant to 35 U.S.C. 119(a)-(d).

BACKGROUND OF THE INVENTION

The invention relates to a threaded connection and more particularly to a threaded connection for a rod assembly made of rod sections of a trench-work apparatus.

The term "trench-work apparatus" within the context of the invention refers to apparatuses configured to transmit drive power from a drive apparatus via a rod assembly to a tool arranged on the rod assembly. These include in particular ground-boring machines used to introduce ground boreholes and in particular horizontal boreholes in the ground. Typically, the drive apparatus transmits pushing or pressing forces and a drive torque via the rod assembly of the ground-boring machine to the tool embodied as a drill head. However, trench-work apparatuses exist where only pushing or pulling forces are transmitted via the rod assembly to a corresponding tool. These include in particular trench-work apparatuses used to widen or pull out existing boreholes in the ground or previously installed pipes and to insert at the same time, if necessary, a new pipe. The trench-work apparatuses are frequently constructed so that they can be used for producing ground boreholes as well as for pulling operations, i.e., for further widening an existing borehole or an old pipe and for pulling in a new pipe, respectively. A pilot borehole can thus be introduced initially with the same trench-work apparatus, wherein a pilot bore head is advanced through the ground by pushing, until the pilot bore head reaches a destination shaft, whereafter the pilot borehole is widened by replacing the pilot bore head in the destination shaft with a widening head and the drilling assembly is retracted. Optionally, at the same time the widening head is pulled in, a new pipe connected to the widening head can be pulled into the widened ground borehole.

The rod assembly of such trench-work apparatuses usually includes several rod sections, which are successively connected with each other commensurate with the advance of the borehole. The individual rod sections are connected via coupling elements, wherein in addition to the plug connections described in DE 196 08 980, in particular, threaded connections are widely used. Important advantages of threaded connections are their low costs and the ability to screw them together automatically in a simple manner. However, a substantial disadvantage of threaded connection is that they frequently represent the weakest points of the rod assembly, caused by the relatively small diameter in the region of the threaded plug of the threaded connection as well as the geometry-related high stress concentration fatigue of the thread itself.

Conventional types of threads used for rod assemblies of trench-work apparatuses are API threads as well as round threads according to DIN 20 400. However, the service life of such thread shapes has proven to be too short in daily operations of the trench-work apparatuses.

Therefore, alternative thread shapes have been developed which are particularly constructed for the specific loads of the rod assembly that occur in trench-work apparatuses. DE 198 03 304 A1 discloses a threaded connection for connecting the rod sections of a rod assembly, wherein the rod assembly is to be used, in particular, for rotary percussion drilling. Important characteristics of these threaded connections are the asymmetric form of the thread with different pitch angles of the flanks that receive the load as well as the flanks that do not receive the load in rotary percussion drilling operations and the provision of an unthreaded insertion section. The flanks that do not receive the load should also be formed as a segment of the circle. The threaded connection disclosed in DE 198 03 304 A1 has turned out not to be sufficiently robust in day-to day operations.

EP 0 324 442 B1 and the U.S. Pat. No. 5,060,740 also disclose asymmetric threaded connections designed for use in connecting rod sections of ground-drilling machines. The threaded connections disclosed in these documents are characterized in that the root of the thread forms a segment of an ellipse. This should facilitate a transition from the root of the thread to the planar flanks of the thread without stress concentration.

WO 2006/092649 A1 discloses threaded connections for rod assemblies of ground-drilling apparatuses where the root of the thread forms a segment of an ellipse. The thread shapes disclosed in this document can be asymmetric as well as symmetric.

None of the conventional thread shapes have so far been able to distinguish themselves by an adequate service life when used for connecting rod sections of a rod assembly of a trench-work apparatus.

Based on the state-of-the-art, it was therefore an object of the invention to provide a threaded connection, in particular, with improved service life, which has an increased service life in particular in an application for connecting rod sections of a rod assembly of a trench-work apparatus.

SUMMARY OF THE INVENTION

According to one aspect of the invention, a threaded plug for a threaded connection includes a core and an exterior thread applied on the core, wherein at least one flank of the exterior thread forms a segment of an ellipse.

According to another aspect of the invention, a threaded connection includes a threaded plug having a core and an exterior thread applied on the core, wherein at least one flank of the exterior thread forms a segment of an ellipse, and a threaded bushing having an interior thread constructed to engage with the exterior thread of the threaded plug.

According to yet another aspect of the invention, a threaded bushing for a threaded connection includes a sleeve having an interior thread, wherein at least one flank of the interior thread forms a segment of an ellipse.

According to still another aspect of the invention, a rod assembly includes a plurality of interconnected rod sections, with each rod section having two ends, wherein one of the two ends is configured as a threaded plug having an exterior thread, with at least one flank of the exterior thread forming a segment of an ellipse, and the other end is configured as a threaded bushing having an interior thread constructed to engage with the exterior thread of the threaded plug.

The core of the invention envisions constructing the exterior thread of a threaded plug of a threaded connection, which preferably can be used to connect rod sections of a rod assembly of a trench-work apparatus, such that flanks of this exterior thread form a segment of an ellipse. According to the invention, all flanks or only some of the flanks can have an elliptical configuration. For example, according to the invention, only the front flanks oriented toward the run-out of the thread may have an elliptical shape, whereas the rear flanks do not.

By shaping the flanks in form of a segment of an ellipse, a continuously changing flank angle is attained, providing optimal contact between the flanks of the threaded plug and the corresponding flanks of an interior thread of a corresponding threaded bushing. This attains a more homogeneous stress distribution, whereby the stress maxima occur in the region of the flanks rather than in the root of the thread. This positively affects the service life of the threaded connection, because geometric stress concentration does not regularly occur in the region of the flanks; the stress concentration in the root of the thread is thereby reduced. With the embodiment of the threaded plug and the corresponding threaded bushing according to the invention of an interconnected threaded connection, only compression forces are produced in the contact region between the threaded plug and the threaded bushing. The bending stresses observed with conventional thread shapes in the region of the root of the thread can thus be largely eliminated. Because compression stresses are more readily tolerated by the materials (typically steel) used for rod assemblies of trench-work apparatuses than bending stresses, the thread shape according to the invention has a very positive effect on the service life of the threaded connections.

In a preferred embodiment of the invention, the flanks of the threaded plug form a segment of a vertical ellipse. In a corresponding interior thread of a threaded bushing of a threaded connection according to the invention, the flanks can also form a segment of a vertical ellipse.

According to the invention, "vertical ellipse" refers to an ellipse wherein the major axis (i.e., the longer of the center axes) forms a greater angle with the center axes of the threaded plug and the threaded bushing, respectively, than its minor axis (i.e., the shorter center axis). The angle between the major axis of the ellipse and the center axes of the threaded plug and/or the threaded bushing is for a vertical ellipse preferably between 70° and 110° and particularly preferred 90°, wherein deviations from these values may result from a cone angle of the threaded plug and/or the threaded bushing.

With the preferred embodiment of the flanks as a segment of a vertical ellipse, particularly steep thread flanks, i.e., particularly large flank angles, are achieved, which particularly reduces spreading of the threaded can when the threaded connection is screwed together.

To design the threaded connection equally for pressing loads and pulling loads, the exterior thread of the threaded plug and, if necessary, also the interior thread of the threaded bushing of the threaded connection according to the invention may be configured symmetrically.

This can advantageously be achieved in that adjacent flanks of a turn of the threaded plug form segments of the same ellipse. The elliptical shape of this one ellipse can also be extended to the root of the thread, so that both flanks and the root of the thread of a turn form one and the same ellipse. Such embodiment of the exterior thread of the threaded plug can have a particularly uniform stress distribution under both pressing and pulling loads.

In a corresponding interior thread of the threaded bushings of a threaded connection according to the invention, the two flanks of a thread profile can form segments of one and the same ellipse. Preferably, the crest of the thread is flat-topped.

In another preferred embodiment of the present invention, the root of the thread of the interior thread of the threaded bushing furthermore forms a segment of a horizontal ellipse. This can further improve the stress distribution in the root of the interior thread of the threaded bushing.

To allow the threaded plug to be easily and quickly screwed into the threaded bushing of the threaded connection according to the invention, the exterior thread of the threaded plug and optionally also the interior thread of the threaded bushing may have a conical shape, i.e., the roots of the thread and/or the crest of the thread of the threaded plug and the threaded bushing, respectively, define an envelope having a conical shape. Preferably, the cone angle is here between 3° and 5°. The cone angle within the context of the invention is defined as the angle enclosed between the envelope and a line extending parallel to the longitudinal axis of the threaded plug or the threaded bushing, respectively.

Advantageously, the flanks of the exterior thread of the threaded plug or the flanks of the interior thread of the threaded bushing are designed so that the thereby defined ellipses are arranged perpendicular to the envelope.

The crests of the thread of the exterior thread of the threaded plug and/or of the interior thread of the threaded bushing are furthermore preferably rounded. This can be provided on one side or on both sides of the transition to the flanks of the thread.

In another preferred embodiment, the thread pitch is between 5 mm and 9 mm, particularly preferred 7 mm. This relatively large thread pitch makes it easier to screw the threaded plug into the threaded bushing. Depending on the thread diameter, a greater or smaller thread pitch may be advantageous. A thread pitch of about 7 mm may advantageously be used, for example, in combination with a flank diameter of the thread of 65 mm (in a conical thread: as the largest diameter).

Preferably, the lead angle should be selected to be relatively shallow to prevent cracks originating from the chamfer of the tap. Advantageously, a lead angle ranging from 20° to 30° has proven to be advantageous; however, smaller or larger chamfer angles may be advantageous depending on the other dimensions of the threaded connection. The chamfer dimension of the threaded plug should preferably be at least 0.5 mm, that of the threaded bushings preferably at least 1 mm.

Furthermore, the difference between the lengthwise dimension of the threaded plug and the threaded bushing should be at most 0.5 mm. This dimension may be important for the contact between the corresponding end faces of the threaded plug and the threaded bushing which transmit pressing and impulse forces, so as to remove stress from the thread itself. This dimension can also be important for the leak tightness of the threaded connection, which is important in particular for its use for connecting rod sections of a trench-work apparatus.

The end face angle, i.e., the angle included, on one hand, between the end faces of the threaded plug and the end faces of the threaded bushing which serve as stop faces and, on the other hand, the longitudinal axis of the threaded connection may preferably be 60° to 80° and particularly preferred 70°.

The threaded connection according to the invention is particularly suited for use to connect rod sections of a rod assembly of a trench-work apparatus, and in particular of a trench-work apparatus subjected to pressing, pulling and jerk forces, for example a horizontal boring machine, which can also be used for pulling in new pipes and/or for widening pilot bore holes. Preferably, the individual rod sections are hereby provided at one end with a threaded plug according to the invention and at the other end with a corresponding threaded bushing.

The invention will now be described in more detail with reference to an exemplary embodiment illustrated in the drawings.

DETAILED DESCRIPTION OF PREFERRED EMBODIMENTS

FIGS. 1 to 4 illustrate a first embodiment of a threaded connection according to the invention. The threaded plug of the invention (FIG. 1) of this threaded connection is formed as an exterior thread on an end of a hollow rod the section 1 of a rod assembly of a trench-work apparatus. The exterior thread of the threaded plug is formed as a conical thread, i.e., the extension of the envelope defined by the individual roots of the thread intersects the longitudinal axis of the threaded plug at an angle (Z) of preferably between 3° and 5°. The corresponding mating interior thread of the threaded bushing (FIG. 3) has a matching cone angle (Z).

Figure 2:
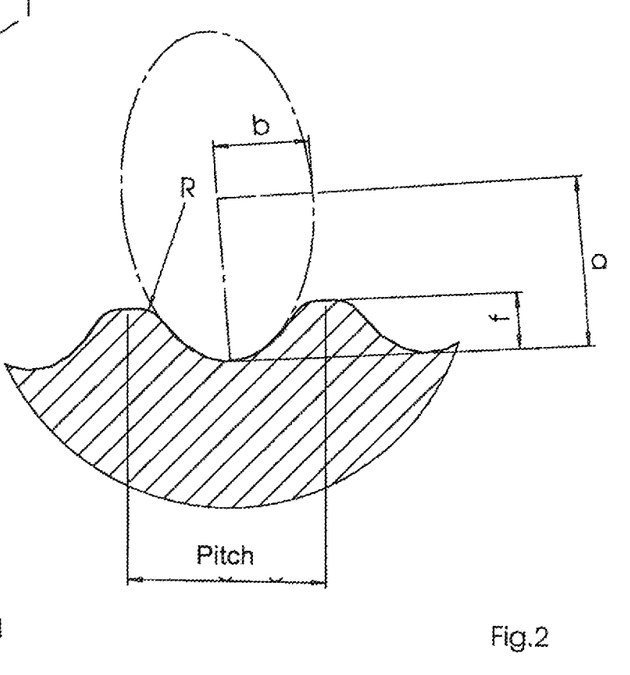
FIG. 2 an enlarged detail of FIG. 1, showing additional data.

As indicated in particular in FIG. 2, both flanks as well as the root of the thread of a turn are formed as segments of one and the same ellipse. The crests of the thread are rounded on both sides with a radius (R). The pitch of the thread is defined by the spacing between two adjacent thread profiles or roots and is in the present example twice the length (b) of the smaller semi-axis (minor axis) of the ellipse. The length of the large semi-axis of the ellipse (major axis) has a dimension (a).

Figure 3:
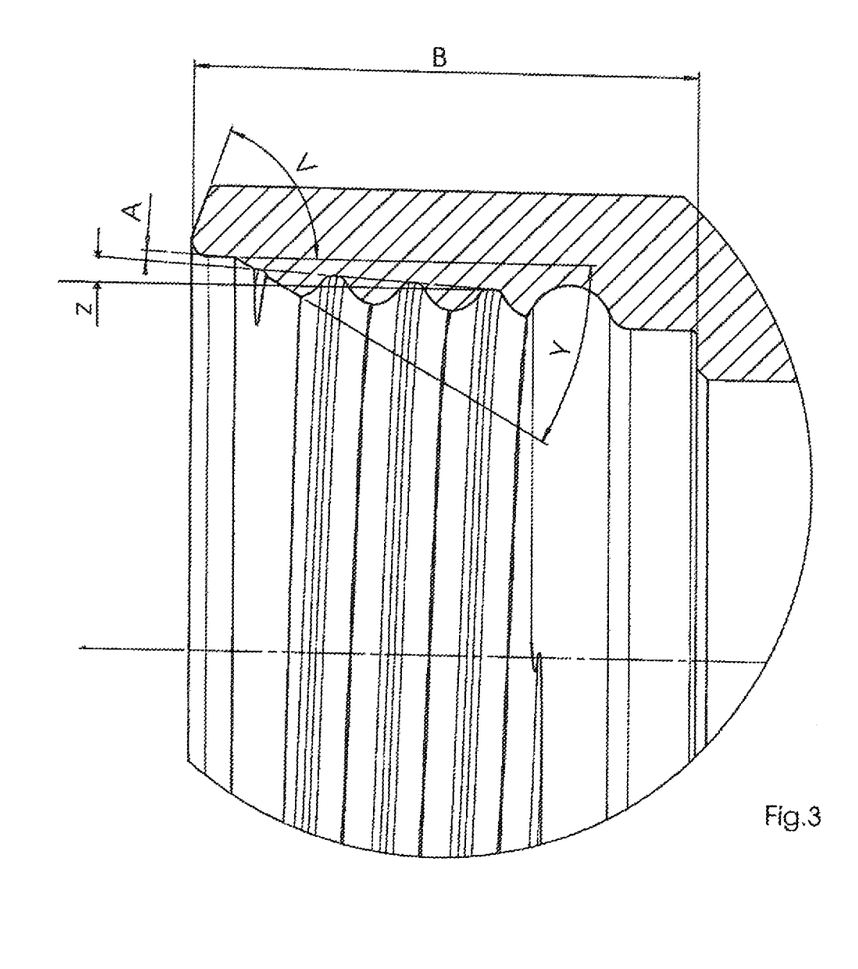
FIG. 3 a threaded sleeve corresponding to the threaded plug of FIG. 1.
Figure 4:
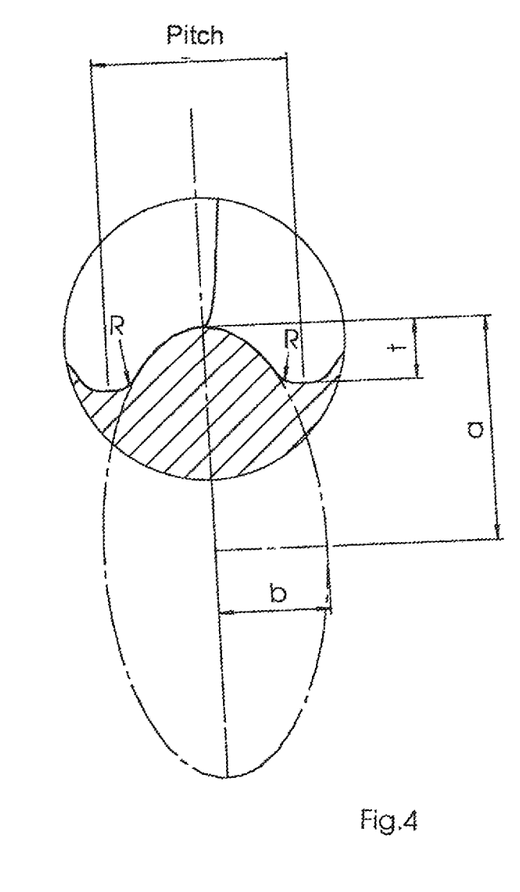
FIG. 4 an enlarged detail of FIG. 3, with additional geometrical data.

The thread shape of the corresponding threaded bushing is shown in detail in FIG. 4. As can be seen, the thread profile, including both thread flanks and the thread crest, form a segment of a single ellipse. The threaded roots of the threaded bushing of FIGS. 3 and 4 are also rounded with the radius (R) commensurate with the thread shape of the threaded plug. The major axes of both ellipses (of the threaded plug and the threaded bushing) are each oriented perpendicular to the envelope defined by the roots of the thread.

The thread depth (t) determines the geometric location of the ellipse in relation to the envelope. The pitch of the thread depends on the length of the minor axes of the ellipses and is in the present example about 7 mm.

Figure 1:
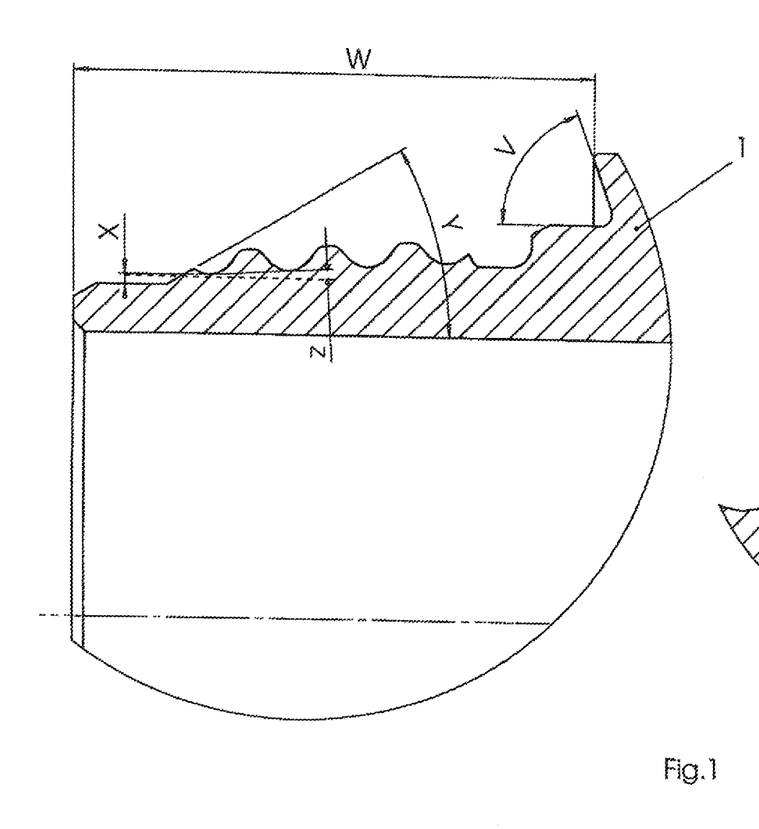
FIG. 1 a partial cross-section through a threaded plug according to the invention in a first embodiment.

The threaded plug of FIG. 1 and the threaded bushing of FIG. 3 each have a chamfer. The chamfer of the threaded plug is defined by the chamfer dimension (X) and the chamfer angle (Y). The chamfer of the threaded bushing is defined by the chamfer dimension (A) of the threaded bushing and by the chamfer angle (Y) which is identical to the chamfer angle (X) of the threaded plug. The chamfer dimension (X) should be at least 0.5 mm and the chamfer dimension (A) should be at least 1 mm.

The lengthwise dimension of the threaded bushing is indicated with (B). The lengthwise dimension of the threaded plug is indicated with (W). Both dimensions are important for the quality of the contact between the end faces following application of the pretensioning torque. The tolerance between the two end faces should in the present example not exceed 0.5 mm, because this tolerance is also imperative for the leak tightness of the connection. In the present example, the end faces of the threaded plug as well as the corresponding end face of the threaded bushing are sloped. Their extension intersects the longitudinal axis at a respective angle (V) of about 70°.

Figures 5, 6:
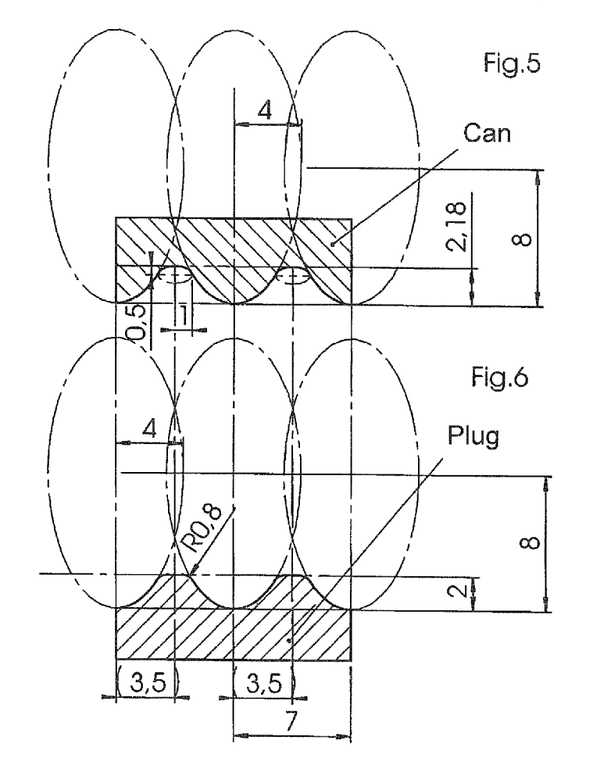
FIG. 5 a partial cross-section through a threaded plug according to the invention in a second embodiment.
FIG. 6 a partial cross-section through the threaded sleeve corresponding to the threaded plug of FIG. 5.
Figure 7:
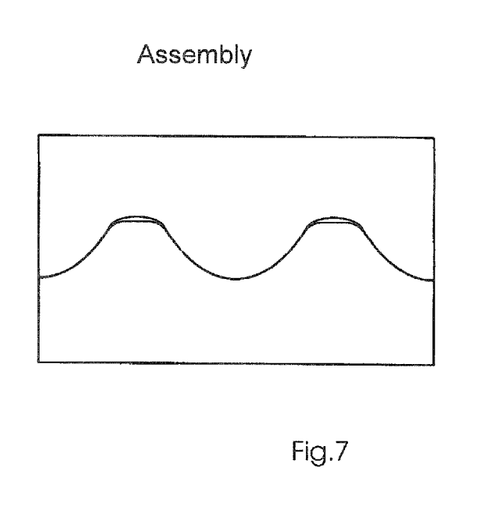
FIG. 7 the threaded plug of FIG. 5 and the threaded bushing of FIG. 6 in a connected state.

FIGS. 5 to 7 illustrate a second embodiment of a threaded connection according to the invention. As a particular characteristic of this threaded connection, the roots of the threads of the threaded bushing additionally also form a segment of an ellipse, in this case horizontal ellipse. This design can further improve the distribution of the stresses to which the interior thread of the threaded bushing is subjected. It has been observed that in the illustrated threaded connection the flat-topped crests of the threads of the threaded plug do not make direct contact with the roots of the threads of the threaded bushing in the screwed-together configuration.

Figure 8:
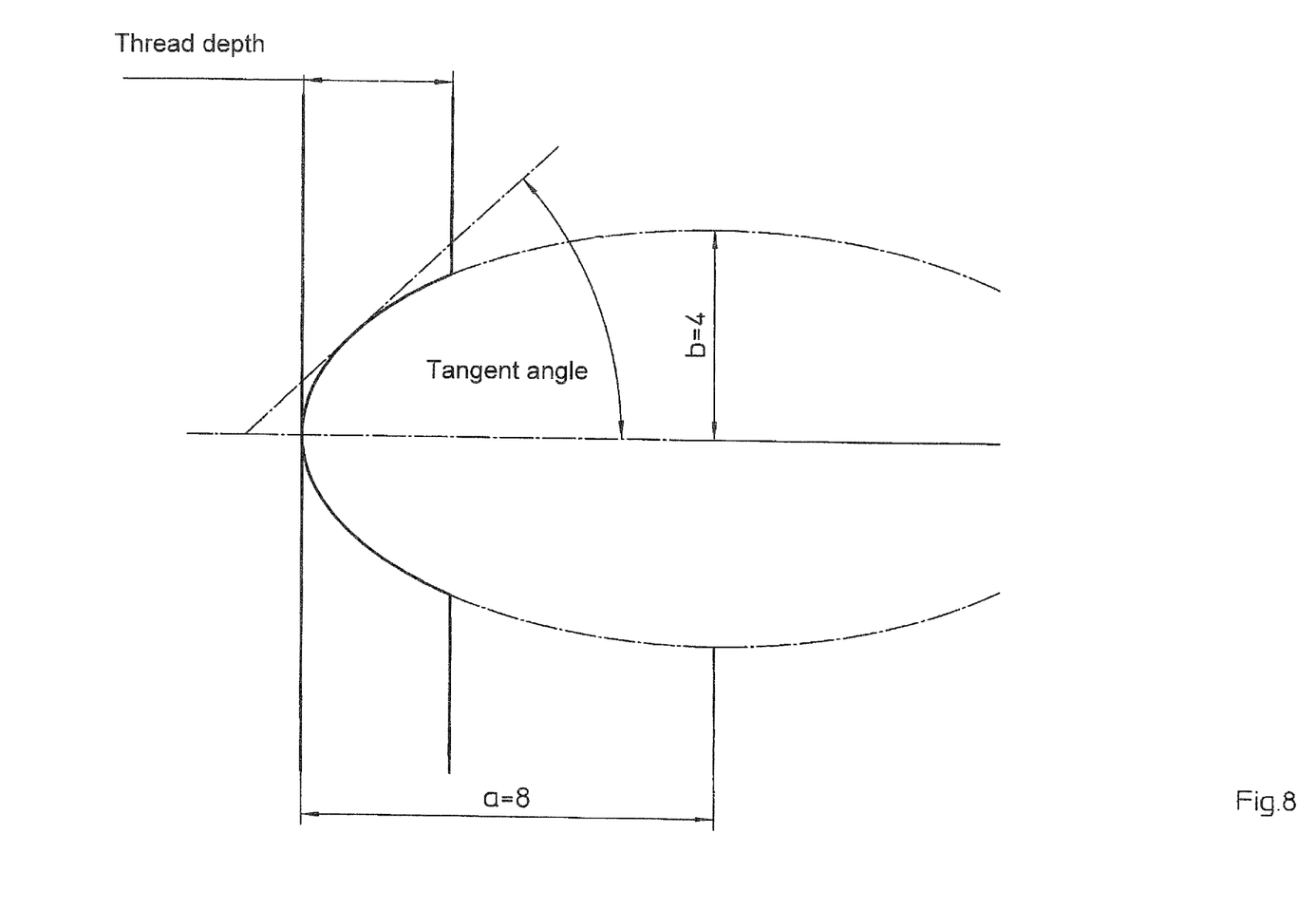
FIG. 8 a diagram with geometric relationships used in the computation of geometric data of ellipses.

In the following, the flank angle and the curvature of the ellipse of a threaded connection according to the invention are calculated with reference to an example. The geometric relationships are shown in the illustration in FIG. 8.

Geometric data ellipse:

$$a := 8 \quad b := 4$$

Thread depth:

$$t := 2$$

The end of the counter loop is determined by the thread depth t:

$$\text{beginning} := 0$$

$$\text{end} := \left[\left(\frac{b}{a}\right)\sqrt{a^2 - (a-1)^2}\right]$$

$$\text{end} = 2.646$$

$$\text{factor} := 0.02$$

Computation of the Y-coordinate based on the geometric data:

$$y := \begin{vmatrix} ind \leftarrow 0 \\ \text{for } i \in \text{beginning, beginning+ factor } \ldots \text{ end} \\ \quad \begin{vmatrix} y_{ind} \leftarrow i \\ ind \leftarrow ind + 1 \end{vmatrix} \\ y^T \end{vmatrix}$$

Geometric data ellipse:

$$a := 8 \quad b := 4$$

Thread depth:

$$t := 2$$

The end of the counter loop is determined by the thread depth t:

$$\text{beginning} := 0$$

$$\text{end} := \left[ \left(\frac{b}{a}\right) \sqrt{a^2 - (a-1)^2} \right]$$

$$\text{end} = 2.646$$

$$\text{factor} := 0.02$$

Computation of the Y-coordinate based on the geometric data:

$$y := \begin{vmatrix} ind \leftarrow 0 \\ \text{for } i \in \text{beginning, beginning+ factor } \ldots \text{ end} \\ \quad \begin{vmatrix} y_{ind} \leftarrow i \\ ind \leftarrow ind + 1 \end{vmatrix} \\ y^T \end{vmatrix}$$

| | 0 | 1 | 2 | 3 | 4 | 5 | 6 | 7 | 8 | 9 | 10 |
|---|---|---|---|---|---|---|---|---|---|---|---|
| Y = 0 | 0 | 0,02 | 0,04 | 0,06 | 0,08 | 0,1 | 0,12 | 0,14 | 0,16 | 0,18 | 0,2 |

Computation of the associated X-coordinate with the formulae for ellipses according to Bartsch, Taschenbuch der mathematischen Formeln (Pocket Book of Mathematical Formulas), Ch. 6.6.3.1:

$$x := \begin{vmatrix} ind \leftarrow 0 \\ \text{for } i \in 0 \ldots \text{length}(y^T) - 1 \\ \quad \begin{vmatrix} x_{0,i} \leftarrow \sqrt{a^2 \left[1 - \frac{(y_{0,i})^2}{b^2}\right]} \\ ind \leftarrow ind + 1 \end{vmatrix} \\ x \end{vmatrix}$$

Computation of the associated X-coordinate with the formula for ellipses according to Bartsch, Taschenbuch der mathematischen Formeln (Pocket Book of Mathematical Formulas), Ch. 6.6.3.1:

$$x := \begin{vmatrix} ind \leftarrow 0 \\ \text{for } i \in 0 \ldots \text{length}(y^T) - 1 \\ \quad \begin{vmatrix} x_{0,i} \leftarrow \sqrt{a^2 \left[1 - \frac{(y_{0,i})^2}{b^2}\right]} \\ ind \leftarrow ind + 1 \end{vmatrix} \\ x \end{vmatrix}$$

| | 0 | 1 | 2 | 3 | 4 | 5 | 6 |
|---|---|---|---|---|---|---|---|
| X = 0 | 8 | 7,9999 | 7,9996 | 7,9991 | 7,9984 | 7,9975 | 7,9964 |

Figure 9:
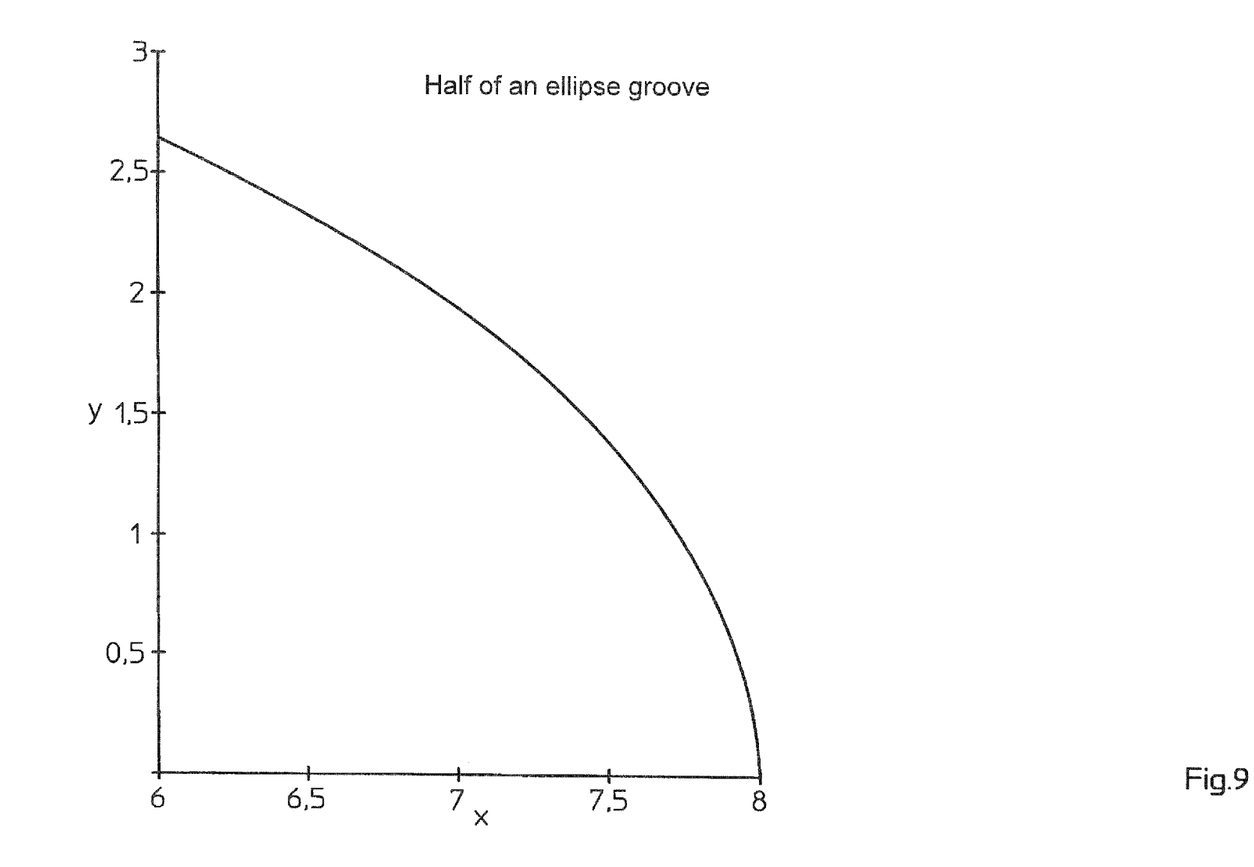
FIG. 9 the graphic result of the computation of geometric data of an actual thread shape.

The result of the computation is illustrated in FIG. 9.

Computation of the slope of the tangent:

$$m_t := \begin{vmatrix} ind \leftarrow 0 \\ ind2 \leftarrow 1 \\ \text{for } i \in 0 \ldots \text{length}(y^T) - 2 \\ \quad \begin{vmatrix} m_{t_{0,i}} \leftarrow \frac{(-b)^2 \cdot x_{0,ind2}}{a^2 \cdot y_{0,ind2}} \\ ind \leftarrow ind + 1 \\ ind2 \leftarrow ind2 + 1 \end{vmatrix} \\ m_t \end{vmatrix}$$

| 7 | 8 | 9 | 10 |
|---|---|---|---|
| 12,5 | 11,1 | 10 | 9,1 |

Computation of the flank angle:

$$\alpha_t := \begin{vmatrix} ind \leftarrow 0 \\ \text{for } j \in 0 \ldots \text{length}((y)^T) - 2 \\ \quad \alpha_{t_{0,j}} \leftarrow \operatorname{atan}(m_{t_{0,j}}) \\ \alpha_t \end{vmatrix}$$

$$\alpha_t =$$

| | 0 | 1 | 2 | 3 | 4 | 5 | 6 | 7 | 8 | 9 |
|---|---|---|---|---|---|---|---|---|---|---|
| 0 | 89, 4° | 88, 9° | 88, 3° | 87, 7° | 87, 1° | 86, 6° | 86, 0° | 85, 4° | 84, 9° | 84, 3° |

Figure 10:
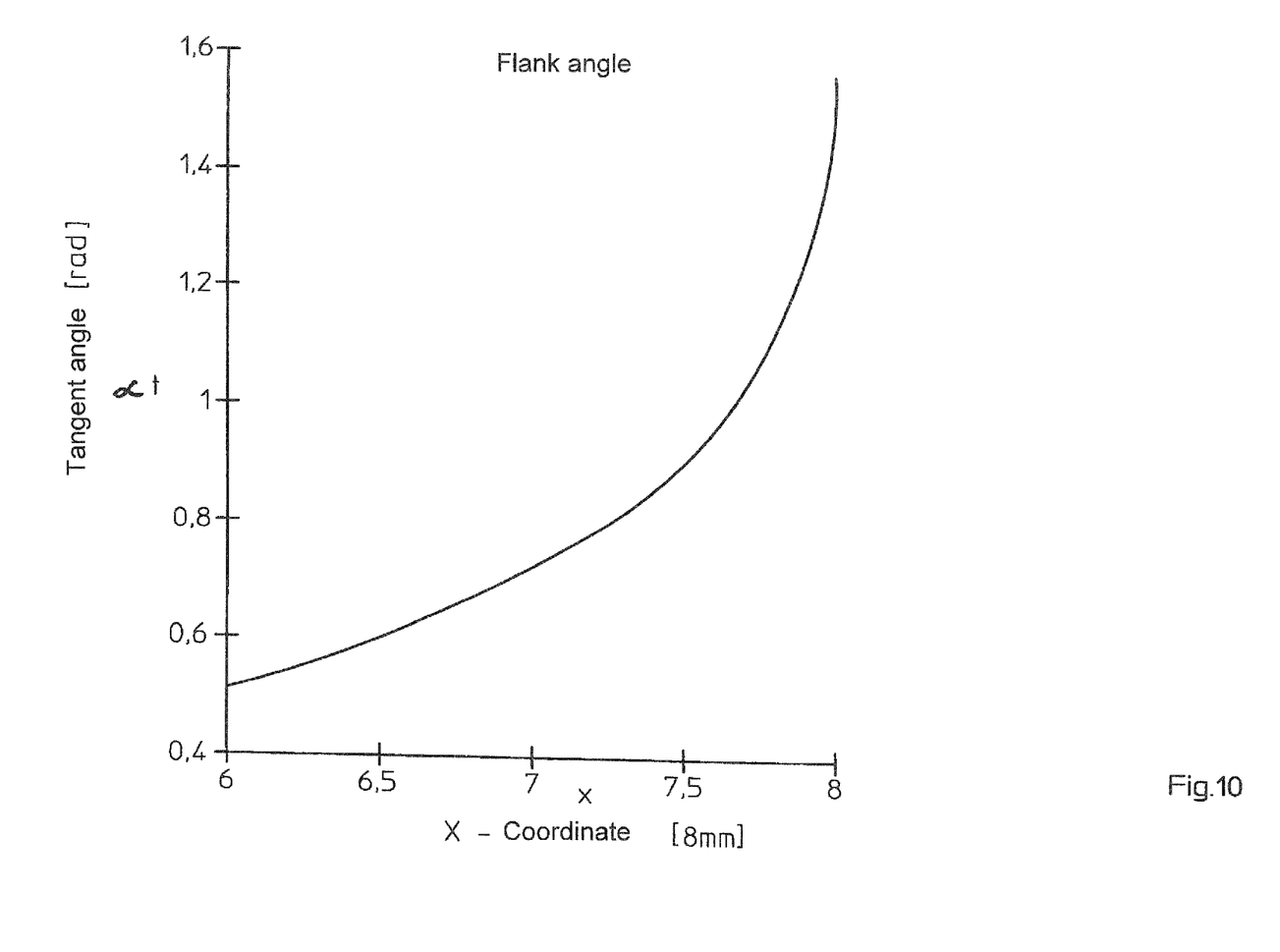
FIG. 10 the graphical illustration of the flank angle of this thread shape.

The result of the computation is illustrated in FIG. 10.

Curvature of the ellipse:

$$\rho := \begin{vmatrix} ind \leftarrow 0 \\ \text{for } k \in 0 \ldots \text{length}(x^T) - 1 \\ \quad \rho_{0,ind} \leftarrow \frac{1}{a^4 \cdot b^4} \cdot \sqrt{\left[ a^4 \cdot (\vec{y^2})_{0,k} + b^4 \cdot (\vec{x^2})_{0,k} \right]^3} \\ ind \leftarrow ind + 1 \\ \rho \end{vmatrix}$$

$$\rho = \begin{array}{|c|c|c|c|c|c|c|c|c|} \hline 0 & 1 & 2 & 3 & 4 & 5 & 6 & 7 & 8 \\ \hline 0 & 2 & 2,001 & 2,002 & 2,004 & 2,006 & 2,008 & 2,011 & 2,014 \\ \hline \end{array}$$

Figure 11:
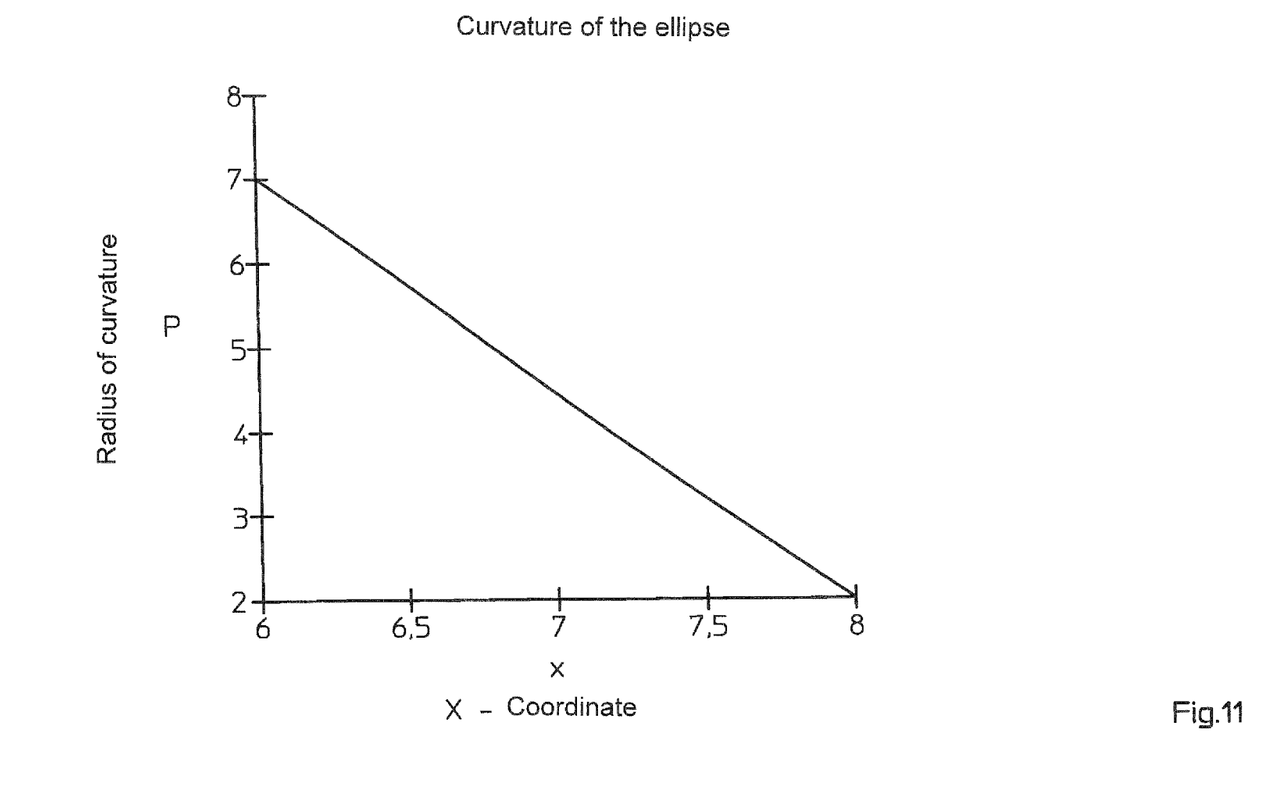
FIG. 11 the graphical illustration of the curvature of the ellipse of this thread shape.

The result of the computation is illustrated in FIG. 11.

Figure 12A:
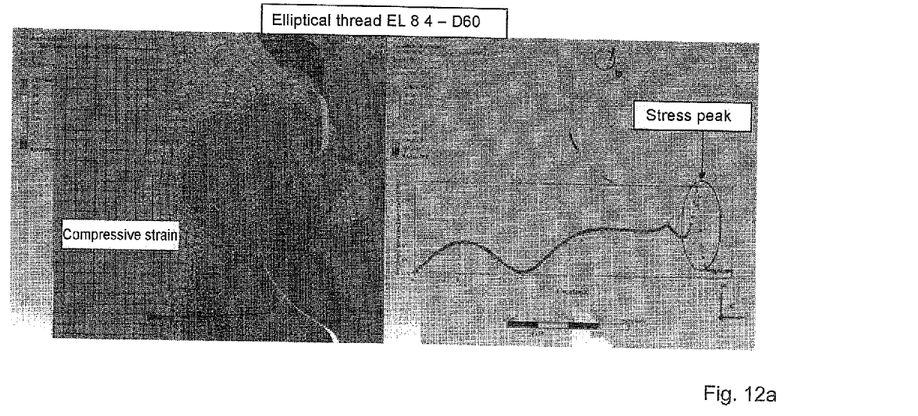
FIG. 12a a FEM simulation of a threaded connection according to the invention.
Figure 12B:
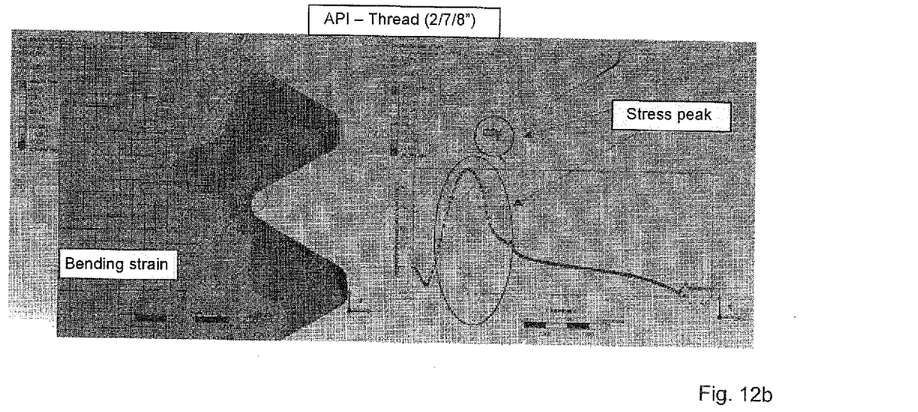
FIG. 12b a FEM simulation of a thread according to the API standard.
Figure 12C:
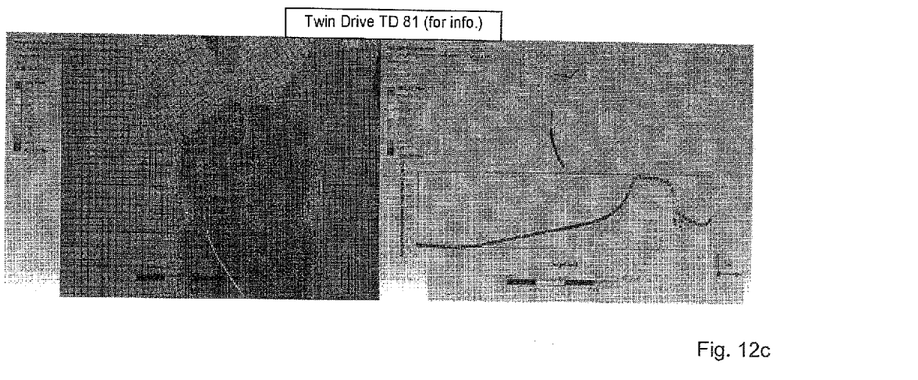
FIG. 12c a FEM simulation of a twin-drive threaded connection.

FIGS. 12a to 12c illustrate the results of FEM simulations for a threaded connection according to the invention (FIG. 12a) as well as two conventional threaded connections for comparison. FIG. 12b shows a thread according to the API standard and FIG. 12c shows a so-called twin-drive threaded connection, the concrete configuration of which is the subject matter of DE 198 03 304 A1 mentioned at the beginning. The three FEM simulations were calculated with the same model for the material (20MnV6, with bilinear kinematic solidification; elastic module: 210,000 MPa; tangent module: 1676 MPa; limit of elasticity: 450 MPa; tensile strength: 640 MPa; transversal contraction number: 0.28).

It is evident that the twin-drive threaded connection has an approximately 30% higher stress level than the threaded connection according to the invention. Although the twin-drive threaded connection has a similar contact as the threaded connection according to the invention illustrated in FIG. 12a, the contact location is locally not very limited, but instead extends over a larger region, which causes a "stress peak" in the stress distribution.

The invention claimed is:

1. A threaded plug for a threaded connection, comprising:
    a core;
    an exterior thread applied on the core, wherein at least one flank of the exterior thread forms a segment of a vertical ellipse, said segment of the vertical ellipse extending continuously from a root of the thread to a corresponding crest of the thread;
    wherein a major axis of the vertical ellipse forms a greater angle with a central axis of the core than a minor axis of the vertical ellipse.

2. The threaded plug of claim 1, wherein the exterior thread is constructed symmetrically.

3. The threaded plug of claim 1, wherein adjacent flanks of a turn form segments of the same ellipse.

4. The threaded plug of claim 3, wherein a root of the exterior thread also forms a segment of the ellipse.

5. The threaded plug of claim 1, wherein the exterior thread is formed as a cone having a cone angle.

6. The threaded plug of claim 5, wherein the cone angle is between 3° and 5°.

7. The threaded plug of claim 6, wherein the cone angle defines an envelope of the core, and wherein a center axis of the ellipse is oriented perpendicularly to the envelope of the core.

8. The threaded plug of claim 1, wherein a crest of the exterior thread is rounded on one side or on both sides of the crest.

9. The threaded plug of claim 1, wherein a pitch of the exterior thread is between 5 mm and 9 mm.

10. The threaded plug of claim 1, wherein a pitch of the exterior thread is 7 mm.

11. The threaded plug of claim 1, wherein a chamfer angle of the exterior thread is between 20° and 30°.

12. The threaded plug of claim 1, wherein a chamfer dimension of the threaded plug is at least 0.5 mm.

13. A threaded connection comprising:
    a threaded plug having a core and an exterior thread applied on the core, wherein at least one flank of the exterior thread forms a segment of a vertical ellipse, said segment of the vertical ellipse extending continuously from a root of the thread to a corresponding crest of the thread, and
    a threaded bushing having an interior thread constructed to engage with the exterior thread of the threaded plug;
    wherein a major axis of the vertical ellipse forms a greater angle with a central axis of the threaded plug than a minor axis of the vertical ellipse.

14. The threaded connection of claim 13, wherein a root of the interior thread forms a segment of a vertical ellipse.

15. The threaded connection of claim 13, wherein a chamfer dimension of the threaded bushing is at least 1 mm.

16. The threaded connection of claim 13, wherein a difference between a lengthwise dimension of the threaded plug and a lengthwise dimension of the threaded bushing is at most 0.5 mm.

17. The threaded connection of claim 13, wherein an end face angle of end faces of the threaded plug and of the threaded bushing is between 60° and 80°.

18. A threaded bushing for a threaded connection, comprising a sleeve having an interior thread, wherein at least one flank of the interior thread forms a segment of a vertical ellipse, said segment of the vertical ellipse extending continuously from a root of the interior thread to a corresponding crest of the interior thread;
    wherein a major axis of the vertical ellipse forms a greater angle with a central axis of the sleeve than a minor axis of the vertical ellipse.

19. A rod assembly comprising a plurality of interconnected rod sections, with each rod section having two ends, wherein one of the two ends is configured as a threaded plug having an exterior thread, with at least one flank of the exterior thread forming a segment of a vertical ellipse, said segment of the vertical ellipse extending continuously from a root of the thread to a corresponding crest of the thread, and the other end is configured as a threaded bushing having an interior thread constructed to engage with the exterior thread of the threaded plug;
    wherein a major axis of the vertical ellipse forms a greater angle with a central axis of the threaded plug than a minor axis of the vertical ellipse.

20. The threaded plug of claim 1, wherein the angle between the major axis of the vertical ellipse and the center axis of the threaded plug is between 70° and 110°.

\* \* \* \* \*